June 7, 1955 G. A. DULMAGE 2,710,231
GRAIN LOADERS
Filed Feb. 13, 1953
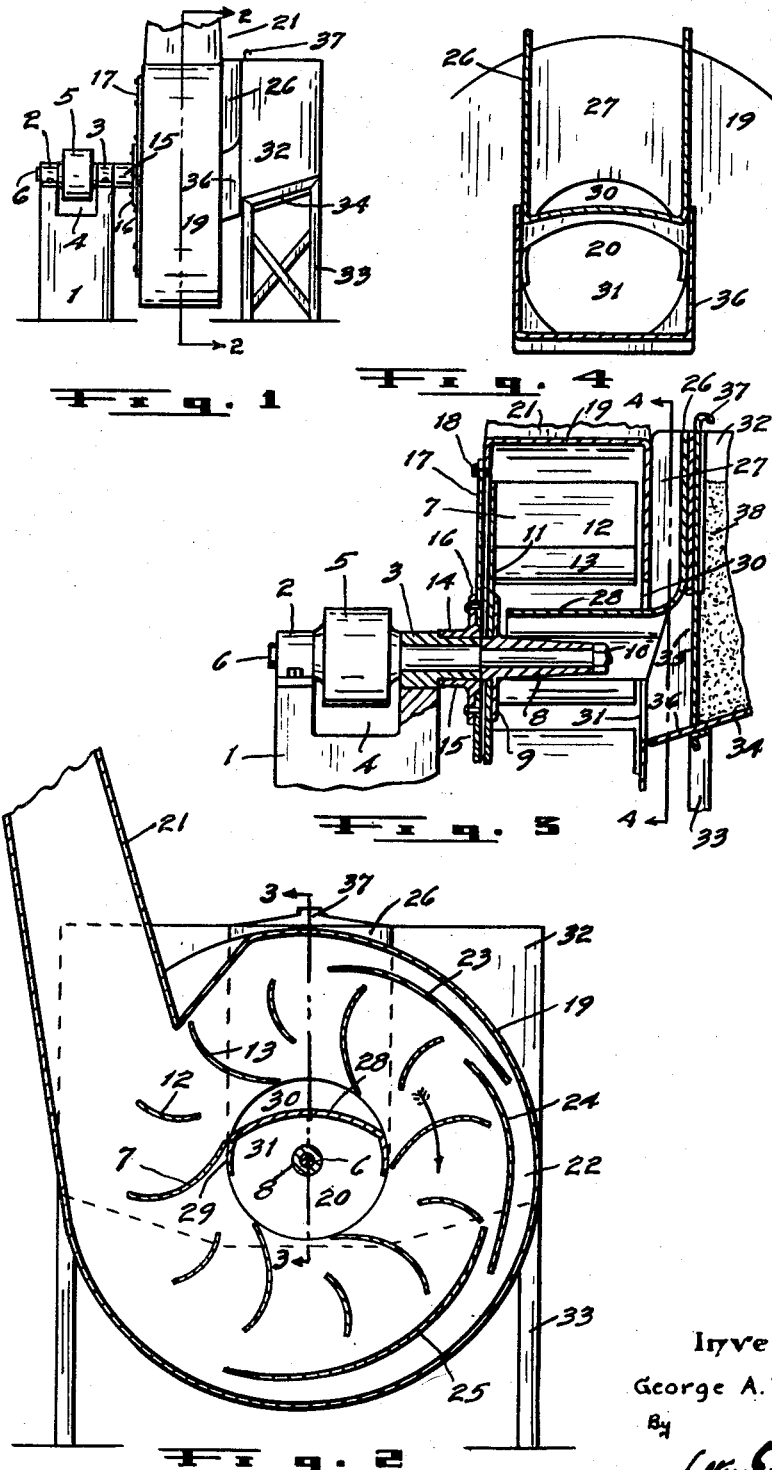
Inventor
George A. Dulmage
By
AGENT

United States Patent Office 2,710,231
Patented June 7, 1955

2,710,231

GRAIN LOADERS

George Arthur Dulmage, Yorkton, Saskatchewan, Canada

Application February 13, 1953, Serial No. 336,845

4 Claims. (Cl. 302—38)

The general object of the invention is to provide a power driven grain loader, of the blower type, which will receive grain from a suitable hopper and elevate it for delivery into trucks, graineries, or the like.

The principal object of the invention is to provide a spouted blower casing, enclosing a power driven rotary fan, and construct the device such, that grain can be delivered therein in large quantities for mechanical ejection up the spout by the blades of the rotating fan, while the fan blades will also develop a strong air blast for later delivery against the ejected suspended grain in the spout to increase its velocity thereup and the distance it will carry.

A further object of the invention is to construct the casing in a rotatable manner on the support so that the spout thereof can be swung to various angles for the best delivery position.

Still further objects of the invention are to provide a stationary hopper for controlled delivery of the grain into the blower casing, divide the blower feed entrance for separate reception of grain and air, provide a special air duct in the blower to build up a high air velocity therein, and provide a quick means of dismantling the construction for cleaning, repairing or replacements.

I attain the above important objects by providing an offset bearing support for the fan shaft, rotatably mount a fan enclosing blower casing at the side of said support, provide separate air and grain entrances centrally and on the opposite side of the blower casing, while constructing a peripherial air duct therewithin, so that a stationary hopper can feed grain into the blower through the grain entrance while the fan will draw air into the blower from the air entrance and deliver it into the duct at the upper part of the blower. The details of the above construction will now be specifically described, reference being had to the accompanying drawings in which:

Figure 1 is an elevation showing the driving shaft mount, the blower casing and the hopper.

Figure 2 is an enlarged vertical sectional view taken on the line 2—2, Figure 1.

Figure 3 is a partial vertical cross sectional view centrally of the machine and taken on the line 3—3, Figure 2.

Figure 4 is a sectional view taken on the line 4—4, Figure 3.

In the drawings like characters of reference indicate corresponding parts in the several figures.

A rectangular-shaped bearing member 1 has the upper part bifurcated to receive a pair of spaced bearings 2 and 3. The cut-out portion 4 of the bearing member, between the bearings, receives a pulley 5 which is suitably secured to a horizontal shaft 6 which is supported by the bearings 2 and 3. One end of the shaft 6 projects from the bearing 3 in a reduced diameter to receive a fan 7 which comprises a hub 8 having a flange 9 thereon adjacent the bearing. The hub is held to the shaft by a suitable key (not shown) and a nut 10 which is screwed on the end of the shaft. The flange 9 carries a disc 11 which supports a series of short and long, staggered, curved blades 12 and 13, best shown in Figure 2, and this completes the fan construction.

The bearing 3 projects slightly outward from the member 1, as shown at 14. This part is machined to provide a circular boss for the rotatable reception of a hub 15 having a flange 16 thereon. The hub 15 is held in position by contact with the hub 8. A disc 17 is carried by the flange 16 and its periphery is bolted at 18 to and supports a blower casing or housing 19 which encloses the fan assembly. The opposite side of the blower casing is provided with a central opening 20 for a feed entrance. The periphery of the blower casing also connects with and carries a tangential delivery spout member 21 along which ejected grain is adapted to travel.

From the above construction it will be seen that, when the pulley 5 is rotated, the fan 7 will be rotated within the blower casing and will centrifugally deliver air or grain out the spout 21 when it is received through the opening 20.

On the inner periphery of the blower casing, remote from the spout 21, an air duct 22 is provided by three partitions 23, 24 and 25. These partitions are separated and are spiralled in relation to the centre of the blower so that air can be driven from the fan thereagainst and will pass therebetween into the duct 22, and the design is such that the partitions, with the blower wall, form jets at their ends to build up a high air velocity as it passes through the duct. Accordingly, when it leaves the last partition 25 it will have considerable force and will be directed up the spout 21.

A U-shaped member 26 has the opened side positioned against the side of the blower casing, just above the entrance opening 20. This member, with the wall of the casing, forms a vertical air passage 27. The central wall of this member has the bottom end bent to pass through the entrance opening 20 and so form a curved partition 28 across the blower at the centre. The edges of this partition are curved downward, as at 29, to fit the edge of the opening 20 and so support the member 26 in position. It will also be noted that the partition 28 divides the entrance opening into a relatively small air opening 30 which communicates with the air passage 27 and a fairly large opening 31 therebelow for the entrance of grain, as will be later described.

A rectangular-shaped grain hopper 32 is supported on a suitable stand 33 at the entrance side of the blower. The hopper has an open top for receiving grain therein and the bottom 34 slopes inward from either end and from the outer side toward the blower casing. An opening 35 is provided in this lower side for grain exit from the hopper and the bottom continues therepast in a U-shaped delivery chute 36 up to the wall of the blower, and to the opening 31. It will also be noted that the sides of the chute span the sides of the member 26 so as to make a closed piping for passage of grain into the blower without spilling. A sliding gate 37 is provided on the wall of the hopper at this point and can be manually lifted or pressed down to regulate the flow or shut it off.

From the above construction it will be seen that grain 38 in the hopper can be delivered to the blower through the opening 31 by manually lifting the gate 37 while air can pass down the passage 27 and through the opening 30 into the upper part of the blower. Accordingly, when the pulley 5 is driven the fan blades will be rotated in a clockwise direction (see arrow in Figure 2) and the rotating blades will catch the falling grain, as it slides thereover, and eject same by centrifugal force bodily up the spout 21 in a steady stream of separate kernels. As the blades in the lower part of the blower are doing this ejecting, the blades in the upper part of the blower are drawing air in from the passage 27 and by centrifugal force are directing it into the air duct behind the partitions 23, 24 and 25 where it builds-up to a high velocity due to the spiral shape of the partitions. As this air leaves the lower end of the duct at high speed, it strikes the suspended grain kernels passing up the spout, builds-up their velocity and carries them along in the air blast at high speed. The built-up speed is so great that the grain leaves the end of the spout (not shown) with sufficient momentum to carry it considerably farther than would normally be expected for the amount of power consumed by the fan rotation.

It has also been found that, as the grain merely slides over the fan blades as it is ejected therefrom, no injury results to the kernels while the spout velocity permits the operator to deliver the grain right to the back of a grainery with ease. As the blower casing is rotatable, the spout can be directed as required for the best delivery position while the stationary hopper and U-shaped chute hold the member 26, containing the air passage, stationary and in a vertical position. At the same time, the quantity of grain delivered is materially increased. As the air duct 22 is partitioned off from the interior of the blower it never becomes plugged with grain unless the fan is not working and the control gate is opened. If such should happen it would be a simple matter to provide a drain door at the bottom of the blower. The duct accordingly, can pass right under the grain falling into the blower and be directed at the most advantageous angle toward the spout for acceleration of the grain passing thereup. In other words; the fan blades serve the dual purpose of ejecting the grain mechanically and air blasting same for the purpose of increasing the grain speed up the spout. And finally, if the device is to be dismantled for any purpose the hopper and U-shaped member 26 can be drawn away to fully expose the opening 20. By removing the nut 10, both the hubs 8 and 15 can be withdrawn to remove both the fan and the blower casing. By later removing the bolts 18, the hub 15 and disc 17 will come away and the fan removed from the casing through the large opening exposed. All parts are then exposed for cleaning, repairing or replacements.

While I have shown the chute 36 of a relatively square cross section against the rounded grain receiving opening 31 of the blower casing, it will be understood that said chute may be streamlined to a relatively semi-circle at this point, if necessary, to prevent grain accumulation at the corners.

What I claim as my invention is:

1. In a grain loader of the blower type, wherein a centrifugal bladed fan is rotatably mounted within a casing having a central entrance on one side and a tangential delivery spout extending from the periphery thereof; means for increasing the velocity of grain passing along said spout, comprising: a partition dividing said entrance into an upper air opening and a lower grain opening; an arced air duct on the periphery of said casing, in communication with the interior thereof and positioned remote from said spout but with the delivery end thereof directed toward said spout; means for feeding grain through said grain opening to fall over the blades of said fan; said fan, in its rotation, adapted to mechanically eject said falling grain directly up said spout and draw air through said air opening and direct same through said duct for delivery into said spout and against the ejected grain passing therealong; and means for driving said fan.

2. A grain loader, comprising: bearing means rotatably supporting a horizontal shaft; a centrifugal bladed fan mounted on said shaft, at the side of said bearing means; a casing rotatably supported on the side of said bearing means and enclosing said fan; a central entrance on the side of said casing, remote from said bearing means, and a tangential delivery spout carried by and extending from the periphery thereof; said entrance divided into an upper air intake opening and a lower grain intake opening; an arced air duct carried by the periphery of said casing, in communication with the interior thereof and positioned remote from said spout but with the delivery end thereof directed toward said spout; means for feeding grain through said grain opening and over the blades of said fan; said fan, in the rotation thereof, adapted to centrifugally eject said falling grain directly out said spout, draw air through said air opening and direct same through said duct for delivery into said spout and against the ejected grain passing therethrough; and means for driving said shaft.

3. In a grain loader of the blower type: a rotary fan mounted within a casing having a tangential spout extending therefrom; an entrance centrally positioned on one side of said casing; the opposite side of said casing rotatably mounted on a bearing stand for manual rocking movement; said entrance divided by a partition to present an upper air opening and a lower grain opening; an exterior air passage to said air opening; hopper means for feeding grain through said grain opening to fall into said casing and over the blades of said fan; said fan adapted, in the rotation of the blades thereof, to mechanically eject said falling grain, by centrifugal force, along the spout of said casing; a peripherial duct within said casing, remote from said spout, and formed by a series of spirally-arranged partitions in relation to the peripherial wall of said casing; and said fan also adapted, in its rotation, to draw air from said air passage and direct same into said duct, by centrifugal force, for delivery into said spout against said ejected grain, to increase the velocity of said grain therealong; and means for driving said fan.

4. A grain loader, comprising: a pair of spaced bearings mounted on a stand; a horizontal drive shaft mounted in said bearings and extending outwardly from one of said bearings; a bladed, centrifugal fan secured to the extending end of said shaft; a circular casing enclosing said fan and removably mounted on one of said bearings for manual rotation therearound; a circular inlet opening centrally positioned on the side of said casing, remote from said bearings; a spout carried by the periphery of said casing, communicating therewith and extending tangentially therefrom; a duct positioned within the walls of said casing, remote from said spout, and formed by a series of spiralled partitions thereacross in combination with the periphery of said casing; an air piping positioned on the side of said casing, above said air intake; the bottom of said piping closed and said closure passing through said inlet opening as a partition, rotatable therein and supporting said piping therefrom; said latter partition dividing said inlet opening to form an upper air inlet communicating with said piping and a lower grain inlet; a stationary hopper positioned at the inlet side of said casing; controlled chute means from said hopper for feeding grain therefrom through said grain inlet and over the blades of said fan; said chute spanning said piping to hold same in position; said fan adapted, in the rotation of the blades thereof, to centrifugally eject said falling grain along said spout, draw air from said piping, and direct said air into said duct, by centrifugal force, for delivery into and along said spout, against the ejected grain passing therealong; and means for driving said shaft.

References Cited in the file of this patent

UNITED STATES PATENTS

| | | |
|---|---|---|
| 973,495 | Fritz | Oct. 25, 1910 |
| 1,512,322 | Wallace | Oct. 21, 1924 |
| 1,900,213 | Wenberg | Mar. 7, 1933 |
| 2,644,723 | Johnston | July 7, 1953 |